United States Patent [19]

Cadée

[11] Patent Number: 4,531,927
[45] Date of Patent: Jul. 30, 1985

[54] TRANSMISSION, IN PARTICULAR FOR A MOTOR VEHICLE

[75] Inventor: Theodorus P. M. Cadée, Goirle, Netherlands

[73] Assignee: Van Doorne's Transmissie B.V., Tilburg, Netherlands

[21] Appl. No.: 532,910

[22] Filed: Sep. 16, 1983

[30] Foreign Application Priority Data

Sep. 16, 1982 [NL] Netherlands ............... 8203581

[51] Int. Cl.$^3$ .................................................. F16H 9/00
[52] U.S. Cl. ........................................... 474/72; 474/11
[58] Field of Search ............... 474/72, 11, 28; 74/689, 74/788, 878

[56] References Cited

U.S. PATENT DOCUMENTS

| | | | |
|---|---|---|---|
| 4,241,618 | 12/1980 | Smirl | 74/689 X |
| 4,246,990 | 1/1981 | Strantz | 74/878 X |
| 4,354,401 | 10/1982 | Omitsu | 74/689 |
| 4,467,669 | 8/1984 | Kawamoto | 474/72 X |
| 4,467,670 | 8/1984 | Kawamoto | 474/72 X |

FOREIGN PATENT DOCUMENTS 1525674 9/1978 United Kingdom .
2058251A 4/1981 United Kingdom .

Primary Examiner—Stephen J. Novosad
Assistant Examiner—Frank H. McKenzie, Jr.
Attorney, Agent, or Firm—Cushman, Darby & Cushman

[57] ABSTRACT

A transmission, in particular for a motor vehicle, provided with an infinitely variable V-belt transmission having a primary and a secondary pulley over which the V-belt has been looped and provided with an input shaft, which is connected through a reversing gear to the primary pulley. The reversing gear being operated by means of a forward and a reverse command, respectively, in such a way as to transmit the same or the opposite direction of rotation. The primary pulley of said transmission is connected to an annular channel radially closed from the outside and into which a stationary pitot tube terminates for picking up a hydraulic signal depending on the speed of rotation, whereby the incorporation of means of control which prevent the reverse signal putting into operation the reversing gear, depending on the hydraulic signal.

3 Claims, 1 Drawing Figure

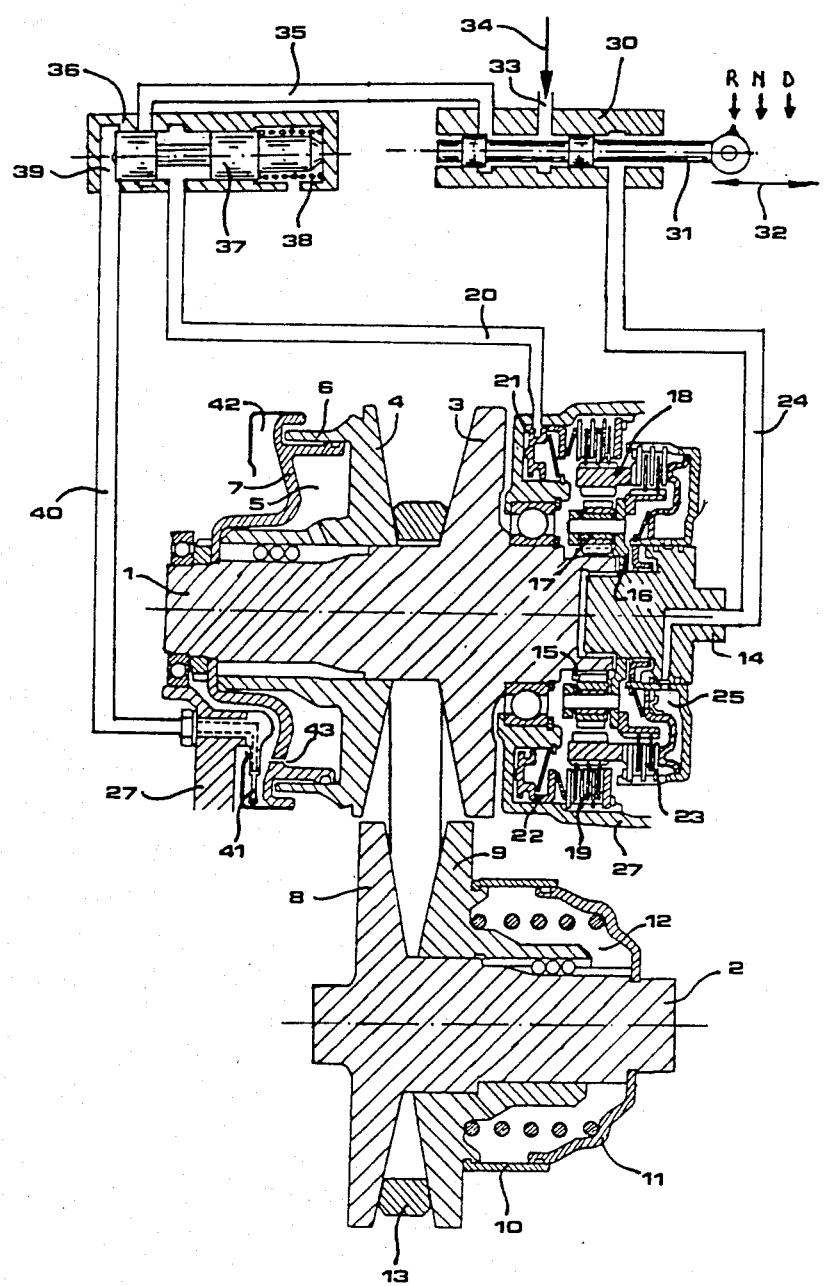

TRANSMISSION, IN PARTICULAR FOR A MOTOR VEHICLE

The invention relates to a transmission, in particular for a motor vehicle, provided with an infinitely variable V-belt transmission having a primary and a secondary pulley over which the V-belt has been looped, also provided with an input shaft which is connected through a reversing gear to the primary pulley, the said reversing gear being operated by means of a forward and a reverse command, respectively, in such a way as to transmit the same or the opposite direction of rotation, in which transmission the primary pulley is connected to an annular channel which is radially closed from the outside and into which a stationary pitot tube terminates for picking up a hydraulic signal depending on the speed of rotation. Such a transmission is known from the British patent application No. 2 058 251, in which the engine of the motor vehicle is connected through a fluid coupling to the reversing gear, so that the reversing gear only takes care of the reversal or non-reversal of the direction of rotation, whereas driving away of the vehicle, whether forward or in reverse, is done with the aid of the fluid coupling. It is also possible, however, to integrate the drive-away function into the reversing gear such that the clutches for forward and reverse driving have, in addition, the capacity to permit driving away from stand-still. A separate driving-away clutch such as a fluid coupling is then superfluous.

The aforesaid pitot tube provides a hydraulic signal which is a measure of the rotation speed of the input shaft of the transmission and which is used for the control of the transmission ratio, as described comprehensively in the British Pat. No. 1 525 674. Such a pitot tube only gives a signal when the annular channel is rotating in a certain direction. The use of a transmission of this type generally implies the presence of a selector lever or some such device operated manually, by the driver of the motor vehicle, whereby at least a forward, a neutral and a reverse position can be set. To guard against faulty manipulation by the driver, it is desired that an inhibitor device should be provided which prevents the reversing gear being set in the reverse position when the vehicle is moving forward at a great speed. This can be achieved, for instance, by locking of the aforesaid lever.

It is the object of the present invention to provide a simple and efficacious safeguard against shifting of the reversing gear into reverse position as long as the vehicle is moving forward, that is at a speed exceeding a preset value.

To this end, provision is made according to the invention for means of control which prevent the reverse signal putting into operation the reversing gear, depending on the hydraulic signal.

As the annular channel during driving in reverse rotates correspondingly in the opposite direction, the pitot tube will only produce a hydraulic signal during forward driving. In addition, the magnitude of the signal increases at increasing rotation speed, so that the means of control may be adjusted such that locking ensues only at speeds above a preset value. By utilizing the hydraulic signal of the pitot tube, the invention affords a very simple means of preventing the transmission from being shifted into reverse at high forward vehicle speed.

The hydraulic signal of the pitot tube may influence the reverse command in different ways. For instance, an electronic contact may be energized when the hydraulic signal exceeds a certain pressure, giving rise to an electric signal which locks the aforesaid gearshift lever.

Alternatively, however, according to a further characteristic of the invention, the means of control may comprise a hydraulic valve which is controlled by the hydraulic signal of the pitot tube, the reverse command may be given through a hydraulic line and the valve may close this hydraulic line.

According to yet another feature of the invention, the hydraulic valve may be provided with a valve body which is loaded by the hydraulic signal of the pitot tube against the force exerted by a spring. In this fashion a simple design is realized, as will be further elucidated in the description of the attached FIGURE.

One embodiment of the transmission according to the invention will now be described, by way of example, with reference to the accompanying drawing.

The FIGURE is a diagrammatic representation of an infinitely variable transmission provided with a primary shaft 1 and a secondary shaft 2. The primary shaft 1 is provided with a fixed conical sheave 3 and an axially displaceable conical sheave 4, the two sheaves 3 and 4 together constituting the primary pulley. The axial displacement of the conical sheave 4 relative to the conical sheave 3 is effected by fluid being passed to the cylinder space 5 formed by sheave 4, a cylindrical extension 6 thereof and a piston 7 firmly attached to the input shaft 1.

Correspondingly, the secondary shaft 2 is provided with a fixed conical sheave 8 and an axially displaceable conical sheave 9, the two sheaves 8 and 9 together constituting the secondary pulley. The conical sheave 9 has a cylindrical extension 10 which accommodates a piston 11 firmly attached to the secondary shaft 2 so as to enclose a cylinder space 12. A V-belt 13 has been looped over the primary and the secondary pulley. By adjustment of the fluid pressure in the cylinder spaces 5 and 12, the running diameter of the V-belt 13 about the primary and the secondary pulley can be made to vary such that an infinitely variable transmission between the primary shaft 1 and the secondary shaft 2 is obtained.

Furthermore, the transmission includes an input shaft 14 which is connected through a planetary gear set to the primary shaft. The planetary gear set comprises a sun gear 15 firmly attached to the primary shaft 1, a carrier 16 with planet gears 17 which is firmly attached to the input shaft 14, and an internally toothed annulus 18. The planet gears consist of inner planet gears 17, which mesh with the sun gear 15, and outer planet gears which mesh with the inner planet gears 17 and with the annulus 18. The outer planet gears are not shown in the FIGURE.

This, otherwise known, planetary gear set permits reversal of the direction of rotation of the primary shaft relative to the input shaft when the annulus 18 is maintained stationary, which can be achieved by energizing the clutch 19 fitted to the transmission housing 27. The engagement of the clutch takes place through the supply of fluid from line 20 to the cylinder space 21, whereby piston 22 is caused to move to the right.

The input shaft 14 and the primary shaft 1 may also be connected together directly upon engagement of clutch 23, whereby the carrier 16 is connected to the annulus 18, so that the planetary gear set is locked. Clutch 23 can be energized by supplying fluid through line 24 to cylinder space 25.

When the transmission has been installed in a vehicle, the engine of the vehicle will be connected to the input shaft 14, whilst the secondary shaft 2 is linked through the indispensable final-drive reduction gear and further gearing to the wheels of the vehicle. When the vehicle moves forward clutch 23 is energized, and when it moves backward clutch 19 is energized. By modulation of the clutches the vehicle can drive away from standstill either forward or backward.

According to the FIGURE the transmission is, in addition, provided with a hydraulic valve 30, featuring an axially displaceable valve body 31. As indicated by arrow 32, the valve body 31 may be set in positions R, N and D. By means of valve 30, the fluid supplied through line 33 (arrow 34) is passed to line 24 (position D), cut-off (position N) or passed to line 35 (position R, in which the valve body 31 is represented).

When the valve body 31 has been set in position D ("drive") clutch 23 can be energized through the supply of fluid by way of line 24 to cylinder space 25. The vehicle incorporating the transmission will then move forward or drive away forward from stand-still. With the valve body 31 in position N ("neutral"), the supply line 33 is blocked, so that neither of clutches 23 and 19 can be energized. If the valve body 31 is set in position R ("reverse")—as shown in the FIGURE—the fluid supplied through line 33 can flow via line 35 to valve 36.

Valve 36 is provided with a valve body 37 which is loaded on the one hand by spring 38 and on the other by the fluid pressure in space 39. The fluid pressure in space 39 is built up through line 40 by means of pitot tube 41. This pitot tube, which can sense the velocity of a fluid flow, is fixedly attached to the transmission housing 27 and terminates into an annular channel 42 which is radially closed from the outside. The channel 42 is attached to piston 7 and, in consequence, rotates with the primary shaft 1. Fluid flows from the primary cylinder space 5 to the annular channel 42 through an aperture 43. Obviously, fluid may also be supplied to the annular channel 42 in some other fashion. The fluid in the annular channel 42 rotates with the primary shaft 1 and causes a fluid pressure in pitot tube 41 as the primary shaft 1 rotates in a certain direction (with the vehicle moving forward). When shaft 1 rotates in the opposite direction (the vehicle moving backward) no pressure build-up occurs. The fluid pressure is passed along through line 40 to space 39 of valve 36.

The mode of operation of valve 36 is as follows. When the vehicle incorporating the transmission is moving forward, the valve body 31 will be in position D. Thereby the clutch 23 is energized, as explained hereinbefore, and the input shaft 14 linked directly to the primary shaft 1. The rotation of the primary shaft causes a pressure build-up in the space 39 of valve 36, so that the valve body 37 is displaced to the right against the force of spring 38. If the valve body 31 is set in position R, whether or not inadvertently., clutch 23 is disengaged, but clutch 19 is not energized, because valve 36 blocks the energizing signal 34 which is sent by valve 30 to line 35. (This situation is represented in the drawing.) As long as sufficient pressure prevails in space 39, blocking continues. Not until the "forward" rotation of the primary shaft, which is connected to the wheels of the vehicle, has become so slow that insufficient pressure is prevailing in space 39, will the valve body 37 move to the left and can the energizing signal be passed to the "reverse" clutch 19. It will be clear that valve 36 blocks a shift into reverse gear as long as the vehicle is travelling forward at a speed exceeding a preset value. This speed depends upon the force of spring 38 and can therefore be adjusted.

When the vehicle is reversing, the primary shaft 1 rotates in the opposite direction so that no fluid pressure builds up in space 39. Valve 36 is therefore constantly open during reverse drive, so that the reverse clutch 19 can be energized at any time.

Obviously, valve 36 may also be designed such that the connection between lines 35 and 20 is not interrupted, but instead a discharge port is opened which causes the pressure in line 20 to release.

The example represented in the FIGURE and described in the foregoing is to be considered only as such. Other variants and embodiments are practicable within the purview of the invention.

I claim:

1. A transmission, in particular for a motor vehicle, provided with an infinitely variable V-belt transmission having a primary and a secondary pulley over which the V-belt has been looped, also provided with an input shaft which is connected through a reversing gear to the primary pulley, the said reversing gear being operated by means of a forward and a reverse command, respectively, in such a way as to transmit the same or the opposite direction of rotation, in which transmission the primary pulley is connected to an annular channel which is radially closed from the outside and into which a stationary pitot tube terminates for picking up a hydraulic signal depending on the speed of rotation, characterized by the incorporation of means of control which prevent the reverse signal putting into operation the reversing gear, depending on the hydraulic signal.

2. A transmission according to claim 1, characterized in that the means of control include a hydraulic valve which is controlled by the hydraulic signal of the pitot tube, that the reverse signal is given through a hydraulic line and that the valve may close this hydraulic line.

3. A transmission according to claim 2, characterized in that the hydraulic valve is provided with a valve body which is loaded by the hydraulic signal of the pitot tube against the force exerted by a spring.

* * * * *